(12) United States Patent
Münzmay et al.

(10) Patent No.: US 7,485,681 B2
(45) Date of Patent: Feb. 3, 2009

(54) AQUEOUS COATING COMPOSITIONS BASED ON POLYURETHANE DISPERSIONS

(75) Inventors: Thomas Münzmay, Dormagen (DE); Harald Blum, Leverkusen (DE); Uwe Klippert, Burscheid (DE); Torsten Pohl, Mt. Lebanon, PA (US); Thorsten Rische, Unna (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 11/904,134

(22) Filed: Sep. 26, 2007

(65) Prior Publication Data

US 2008/0090956 A1  Apr. 17, 2008

(30) Foreign Application Priority Data

Sep. 29, 2006  (DE)  ........................ 10 2006 046 650

(51) Int. Cl.
*C08G 18/28* (2006.01)
*C08G 18/06* (2006.01)
*C08G 18/08* (2006.01)
*C08G 18/00* (2006.01)

(52) U.S. Cl. ..................... 524/590; 524/591; 528/85

(58) Field of Classification Search ............... 524/590, 524/591; 528/85
See application file for complete search history.

(56) References Cited

U.S. PATENT DOCUMENTS

| 4,108,814 A | 8/1978 | Reiff et al. ........... 260/29.2 TN |
| 4,791,230 A * | 12/1988 | Lin et al. .................... 564/159 |
| 5,126,393 A | 6/1992 | Blum et al. ................. 524/538 |
| 5,135,992 A * | 8/1992 | Chang et al. ................ 525/446 |
| 5,252,696 A | 10/1993 | Laas et al. ..................... 528/49 |
| 5,569,707 A | 10/1996 | Blum et al. ................. 524/591 |
| 5,780,559 A | 7/1998 | Humbert et al. ............. 525/452 |
| 6,426,414 B1 | 7/2002 | Laas et al. .................. 544/222 |
| 6,455,632 B1 * | 9/2002 | Gindin et al. ............... 524/591 |
| 6,767,958 B2 | 7/2004 | Laas et al. .................. 524/840 |
| 7,176,254 B2 * | 2/2007 | Rische et al. ............... 524/591 |
| 2002/0068789 A1 | 6/2002 | Gindin et al. ............... 524/589 |
| 2004/0034162 A1 | 2/2004 | Laas et al. .................. 524/589 |
| 2005/0159541 A1 * | 7/2005 | Rische et al. ............... 524/591 |
| 2006/0237682 A1 * | 10/2006 | Rische et al. .............. 252/8.83 |
| 2008/0081870 A1 * | 4/2008 | Rische et al. ............... 524/591 |
| 2008/0090956 A1 * | 4/2008 | Munzmay et al. ........... 524/590 |

FOREIGN PATENT DOCUMENTS

| CA | 2253119 | 5/1999 |
| DE | 100 07 821 A1 | 8/2001 |

* cited by examiner

*Primary Examiner*—Mark Eashoo
*Assistant Examiner*—Noah Frank
(74) *Attorney, Agent, or Firm*—Connolly Bove Lodge & Hutz LLP

(57) ABSTRACT

The invention relates to water-dilutable, hydroxy-functional polyurethanes containing amide structural units, to a process for preparing them, to aqueous coating compositions prepared from them, and to their use for coating substrates.

12 Claims, No Drawings

_US 7,485,681 B2_

AQUEOUS COATING COMPOSITIONS BASED ON POLYURETHANE DISPERSIONS

CROSS-REFERENCE TO RELATED APPLICATIONS

The present application claims the right of priority under 35 U.S.C. §119 (a)-(d) of German Patent Application Number 10 2006 046 650.0, filed Sep. 29, 2006.

BACKGROUND OF THE INVENTION

The invention relates to water-dilutable, hydroxy-functional polyurethanes containing amide structural units, to a process for preparing them, to aqueous coating compositions prepared from them, and to their use for coating substrates.

For years the efforts at weight saving in the passenger car sector have gone hand in hand with increased use of plastic, in the interior as well. Because of aesthetic and technical requirements, plastics components in the car are typically coated, in order to protect the plastic against external influences, such as sunlight and chemical, thermal and mechanical exposure, in order to obtain certain shades and colour effects, in order to mask defects in the plastic surface or in order to give the plastic surface a pleasant feel (tactility). In order to enhance the tactile properties of plastics components in the car interior, use has been made increasingly in recent years of what are called soft feel coating materials. "Soft feel effect" for the purposes of the present invention denotes a particular tactual sensation (tactility) of the coated surface. This tactility can be described using terms such as velvety, soft, rubber-like or warm, whereas, for example, the surface of a painted car body or else an unpainted polymeric sheet or plexiglass, or a similar plate or plexiglass coated with a customary clearcoat or topcoat material, feels cold and smooth.

Aqueous soft feel coating materials based on the polyurethane chemistry are disclosed by way of example in EP-A 0 669 352. As well as an excellent soft feel effect, these coating materials also produce coatings of high stability and protective effect for the plastics substrate.

In the intervening period the requirements imposed on soft feel coating materials for the automotive interior sector, particularly in respect of resistance to creams used for skin protection and skincare (e.g. sun cream or sun lotion), have risen to such an extent that these requirements can be met not at all, or only with detractions in terms of the soft feel effect, by the state-of-the-art coating materials.

There continues to be a need for aqueous coating compositions which have good resistance properties, particularly towards creams used for skin protection and skincare, while at the same time having a pronounced soft feel effect.

Surprisingly it has now been found that water-dilutable, hydroxy-functional polyurethanes comprising amide structural units are suitable for producing coating materials featuring excellent resistance towards, for example, creams used for skin protection and skincare, such as sun cream or sun lotion, and having at the same time an outstanding soft feel effect.

U.S. Pat. No. 5,780,559 discloses film-forming polyurethanes which contain terminal amide groups and can be crosslinked using melamine resins. The acid resistance and hardness of the coatings are high. However, the polyurethanes disclosed therein are not suitable for use in aqueous systems. Furthermore, the film-forming polymers described are not suitable for application in the automotive interior sector, since the temperatures needed for this crosslinking cannot be employed for the plastics materials that are typically used in the automotive interior sector.

US-A 2002/0068789 discloses aqueous dispersions of polyurethanes containing amide groups, but again without the structures according to the invention. They are reacted with crosslinking agents that are reactive towards amide groups. Thermally curable one-component systems are obtained which are used in particular in the passenger car sector as OEM coatings.

An object of the present invention was therefore to provide a suitable polyurethane component which, in conjunction with isocyanate crosslinkers, produces coating compositions which possess a soft feel effect and are at the same time particularly resistant to skin protection and skincare creams, especially sun protection creams.

This object is achieved through the water-dilutable polyurethanes of the invention.

SUMMARY OF THE INVENTION

The present invention provides water-dilutable, hydroxy-functional polyurethanes comprising structural units of the formula (I)

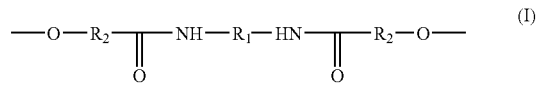

in which
$R_1$ is an aliphatic or cycloaliphatic radical having 2 to 18 carbon atoms and
$R_2$ is an aliphatic radical having 3 to 5 carbon atoms.

DETAILED DESCRIPTION OF THE PREFERRED EMBODIMENTS

The polyurethanes of the invention have an amide group content, calculated as (CO)NH, of 2.0% to 20% by weight, preferably 2.0% to 15% by weight, particularly preferred 3.0 to 10% by weight.

Preference is given to water-dilutable, hydroxy-functional polyurethanes which contain as synthesis components A1) 25%-80%, preferably 30%-60%, by weight of at least one polyol containing amide groups, with a molecular weight Mn of 314 to 5000 Da, A2) 0%-60%, preferably 10%-50%, by weight of at least one polyol selected from the group of polyesters, polycarbonates or polyethers, with a number-average molecular weight Mn of 400 to 6000 Da, A3) 0%-20%, preferably 1%-15%, by weight of at least one low molecular weight polyol having at least two hydroxyl groups, with a number-average molecular weight of 62 to 400 Da, A4) 2%-10%, preferably 3%-8%, by weight of at least one compound which has at least two groups that are reactive towards isocyanate groups, and at least one group that is capable of forming anions, and A5) 5%-50%, preferably 8%-30%, by weight of one or more polyisocyanates, the sum of components A1 to A5) making 100%.

Examples of polyols suitable as component A1), containing amide groups, are polyester polyols synthesized from diols and also, where appropriate, triols and tetraols and from dicarboxylic acid and also, where appropriate, tricarboxylic and tetracarboxylic acids or hydroxycarboxylic acids or lactones. In place of the free polycarboxylic acids it is also possible to use the corresponding polycarboxylic anhydrides or corresponding polycarboxylic esters of lower alcohols in order to prepare the polyester polyols.

Examples of suitable diols are ethylene glycol, diethylene glycol, triethylene glycol, polyalkylene glycols such as polyethylene glycol, and also 1,2-propanediol, 1,3-propanediol, butane-1,3-diol, butane-1,4-diol, hexane-1,6-diol and isomers, neopentyl glycol, the three last-mentioned compounds being preferred. Polyols which can be used as well if appropriate include here, by way of example, trimethylolpropane, glycerol, erythritol, pentaerythritol or trishydroxyethylisocyanurate.

Examples of suitable dicarboxylic acids include the following: phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, maleic acid, fumaric acid, itaconic acid, malonic acid, suberic acid, 2-methyl-succinic acid, and their possible anhydrides. For the purposes of the present invention the anhydrides, though, are encompassed by the expression "acid". It is also possible to use monocarboxylic acids, such as benzoic acid and hexane-carboxylic acid, provided that the average OH functionality of the polyol is $\geq 2$. Saturated aliphatic or aromatic acids are preferred, such as adipic acid, phthalic acid, hexahydro- and tetrahydrophthalic acid or isophthalic acid. As a polycarboxylic acid for additional use where appropriate, in minor amounts, mention may be made here of trimellitic acid.

Examples of hydroxycarboxylic acids, which can be used as co-reactants when preparing a polyester polyol having terminal hydroxyl groups, are hydroxycaproic acid and hydroxybutyric acid. Suitable lactones are caprolactone, butyrolactone and their homologues, for example.

Critical to the invention, however, is that one or more polyol components containing amide groups are used when preparing the polyurethanes of the invention. Suitable polyols containing amide groups are obtainable, for example, by reaction of polyamines with lactones. Preferred polyamines are aliphatic diamines such as ethylenediamine, 1,6-hexamethylenediamine, 2-methyl-1,5-diaminopentane (Dytec® A, DuPont/Bad Homburg), 1-amino-3,3,5-trimethyl-5-aminomethylcyclohexane (isophoronediamine), piperazine, 1,4-diamino-cyclohexane or the isomers of bis(4-aminocyclohexyl)methane and mixtures thereof, and also Laromin® C260 (4,4'-diamino-3,3'-dimethylcyclohexylmethane, BASF AG, DE). Suitable lactones are all lactones available on the industrial scale, particularly ε-caprolactone.

The polyurethanes of the invention preferably comprise reaction products of compounds selected from the group consisting of 1,6-hexamethylenediamine, 2-methyl-1,5-diaminopentane, 1-amino-3,3,5-trimethyl-5-aminomethylcyclohexane (isophoronediamine), the isomers of bis(4-aminocyclohexyl)methane, and mixtures thereof, with ε-caprolactone. Typically in this case at least one, preferably one to five, more preferably one ε-caprolactone molecule is added on per amino group of the amine.

The latterly described reaction products of diamines with ε-caprolactone can be used directly, without further reaction, as synthesis component A1).

In a further preferred embodiment the polyol components containing amide groups are used as synthesis components in the formation of a polyester polyol containing amide groups suitable for use as component A1).

Component A1) comprises structural units of formula (I) having an amide group content, calculated as (CO)NH, of at least 7.5% by weight, preferably at least 9% by weight. The polyols A1) containing amide groups have a number-average molecular weight Mn of 314 to 5000 Da, preferably 398 to 2000 and more preferably from 398 to 1250.

Polyester polyols which can be used as component A2) have a number-average molecular weight Mn of 400 to 6000 Da, preferably of 600 to 3000 Da, more preferably of 1500 to 2200 Da; their hydroxyl number is 20 to 400, preferably 50 to 200 and more preferably 80 to 160 mg KOH/g, and they have an OH functionality of 1.5 to 3.5, preferably of 1.8 to 2.7 and more preferably of 1.95 to 2.5.

Highly suitable examples are the conventional polycondensates of diols and also, where appropriate, of polyols and of dicarboxylic and also, where appropriate, polycarboxylic acids or hydroxycarboxylic acids or lactones, as already mentioned under A1).

Also suitable as polyol components are homopolymer or copolymers of lactones, which are obtained preferably by addition of lactones or lactone mixtures, such as γ-butyrolactone, ε-caprolactone and/or methyl-ε-caprolactone, with suitable starter molecules having a functionality of two and/or more, such as, for example, the low molecular weight polyhydric alcohols specified above as synthesis components for polyester polyols.

Additionally suitable as component A2) are hydroxyl-containing polycarbonates which are obtainable, for example, by reaction of carbonic acid derivatives, such as diphenyl carbonate, dimethyl carbonate or diethyl carbonate, for example, or phosgene, with polyols, preferably diols. Suitable such diols include, for example, butane-1,4-diol and hexane-1,6-diol but also lactone-modified diols. Particularly preferred as component A2) are polycarbonate polyols having a hydroxyl number of 20 to 172 mg KOH/g, more preferably of 28 to 112 mg KOH/g, and an average functionality of 1.6 to 3, preferably 1.9 to 2.3 and more preferably from 1.95 to 2.

The low molecular weight polyols A3) used to synthesize the polyurethane resins generally have the effect of stiffening and/or branching the polymer chain, and possess in general a number-average molecular weight of 62 to 400 Da, preferably from 62 to 200 Da. They may contain aliphatic, cycloaliphatic or aromatic groups. Mention may be made here, by way of example, of the low molecular weight polyols having up to 20 carbon atoms per molecule, such as ethylene glycol, diethylene glycol, triethylene glycol, 1,2-propanediol, 1,3-propanediol, 1,4-butanediol, 1,3-butylene glycol, cyclohexanediol, 1,4-cyclohexanedimethanol, 1,6-hexanediol, hydroquinone dihydroxyethyl ether, bisphenol A (2,2-bis(4-hydroxyphenyl)propane), hydrogenated bisphenol A (2,2-bis (4-hydroxy-cyclohexyl)propane) and mixtures thereof, and also trimethylolpropane, glycerol or pentaerythritol. Ester diols can be used as well, such as δ-hydroxybutyl-ε-hydroxycaproic acid ester, co-hydroxyhexyl-7-hydroxybutyric acid ester, β-hydroxyethyl adipate or bis(β-hydroxyethyl) terephthalate.

Ionic or potentially ionic compounds suitable as component A4) are, for example, dihydroxycarboxylic acids, diaminocarboxylic acids, dihydroxysulphonic acids, diaminosulphonic acids and their salts such as, for example 2-(2-aminoethyl-amino)ethanesulphonic acid, ethylenediamine-propyl- or butylsulphonic acid, 1,2- or 1,3-propylenediamine-β-ethylsulphonic acid, 3,5-diaminobenzoic acid, the hydrophilizing agent of Example 1 from EP-A 0 916 647 and the alkali metal salts and/or ammonium salts thereof; the adduct of sodium bisulphite with but-2-ene-1,4-diol, the propoxylated adduct of 2-butenediol and NaHSO$_3$ (e.g. in DE-A 2 446 440, page 5-9, formula I-III) as hydrophilic synthesis components. Preferred ionic or potential ionic compounds A4) are those which possess carboxyl and/or carboxylate groups. Preferred ionic compounds A4) are dihydroxycarboxylic acids, especially α,α-dimethylolalkanoic acids, such as 2,2-dimethylolacetic acid, 2,2-dimethylolpropionic acid, 2,2-dimethylolbutyric acid, 2,2-dimethylolpentanoic acid or dihydroxysuccinic acid. Particularly preferred are 2,2-dimethylolpropionic acid and 2,2-dimethylolbutyric acid.

Suitable polyisocyanates of component A5) are the aromatic, araliphatic, aliphatic or cycloaliphatic polyisocyanates that are known per se to the skilled person, with an isocyanate functionality of preferably $\geq 2$, which may also contain imino-oxadiazinedione, isocyanurate, uretdione, urethane, allophanate, biuret, urea, oxadiazinetrione, oxazolidinone, acylurea and/or carbodiimide structures. These polyisocyanates may be used individually or in any desired mixtures with one another.

Examples of suitable polyisocyanates are hexamethylene diisocyanate (HDI), isophorone diisocyanate (IPDI), 2,2,4 and/or 2,4,4-trimethylhexamethylene diisocyanate, the isomeric dicyclohexylmethane 4,4'-diisocyanates or mixtures thereof, 4-isocyanatomethyl-1,8-octane diisocyanate and 1,4-cyclohexyl diisocyanate, 1,4-phenylene diisocyanate, 2,4- and/or 2,6-toluoylene diisocyanate, the isomers of diphenylmethane diisocyanates (MDI), or derivatives based on the aforementioned diisocyanates with uretdione, isocyanurate, urethane, allophanate, biuret, iminooxadiazinedione and/or oxadiazinetrione structure with more than 2 isocyanate groups.

The polyisocyanates or polyisocyanate mixtures of the aforementioned kind are preferably those containing exclusively alphatically and/or cycloaliphatically attached isocyanate groups. Particularly preferred are hexamethylene diisocyanate, isophorone diisocyanate, the isomers of dicyclohexylmethane 4,4'-diisocyanate, and mixtures thereof.

The preparation of the water-dilutable polyurethanes of the invention takes place by methods which are known in principle. For example, they may be prepared by first preparing an isocyanate-functional prepolymer from component A5) and from one or more compounds of components A1) to A4) and, in a second reaction step, by reaction with one of the compounds of A1) to A4), preferably A3) and A4), in a non-aqueous medium, obtaining an OH-functional polyurethane. Alternatively, the preparation may take place by forming the OH-containing polyurethane resin directly, by reacting components A1) to A5) in a corresponding molar ratio in a non-aqueous medium, as described for example in EP-A 0 427 028, p. 4, 1. 54-p. 5, 1. 1.

The urethanization reaction or the prepolymer preparation is normally carried out at temperatures from 30° to 140° C., depending on the reactivity of the isocyanate employed. The urethanization reaction can be accelerated using appropriate catalysts, of the kind known to the skilled person for the purpose of accelerating the NCO—OH reaction. Examples are tertiary amines such as triethylamine, organotin compounds such as dibutyltin oxide, dibutyltin dilaurate or tin bis(2-ethylhexanoate), or other organometallic compounds.

The urethanization reaction can also be carried out in the presence of solvents that are inactive towards isocyanates. Particularly suitable solvents for this purpose are those which are compatible with water, such as ethers, ketones and esters and also N-methyl- or N-ethylpyrrolidone, for example. The amount of this solvent appropriately does not exceed 30% by weight and is preferably $\leq 25\%$ by weight, more preferably $\leq 10\%$ by weight, based in each case on the sum of polyurethane resin and solvent. The polyisocyanate can be added to the solution of the remaining components.

The acid groups incorporated in the polyurethane resin via component A4) may be at least partly neutralized. Particularly suitable for the neutralization are tertiary amines, examples being trialkylamines having 1 to 12, preferably 1 to 6, carbon atoms in each alkyl radical. Examples thereof are trimethylamine, triethylamine, methyldiethylamine, tripropylamine and diisopropylethylamine. The alkyl radicals may for example also carry hydroxyl groups, such as dialkylmonoalkanolamine, alkyldialkanolamine and trialkanolamine. An example thereof is dimethylethanol-amine, which serves preferably as a neutralizing agent. As neutralizing agent it is also possible where appropriate to use inorganic bases, such as ammonia or sodium hydroxide or potassium hydroxide. The neutralizing agent is used commonly in a molar ratio with respect to the acid groups of the prepolymer of 0.3:1 to 1.6:1, preferably of 0.5:1 to 1.3:1.

COOH groups may be neutralized before, during or following the urethanization reaction. The neutralizing step is preferably carried out following the urethanization reaction, in general at between room temperature and 120° C., preferably 60 to 100° C. It is also possible to provide the water-dilutable polyurethane resin in a non-neutralized form and to carry out the neutralization only when preparing the aqueous coating composition, such as when incorporating the water-dilutable polyurethanes of the invention into the substantially OH-free polyurethane dispersion(s), for example.

The water-dilutable polyurethane resins of the invention generally possess a number-average molecular weight Mn of 1000 to 30 000 D$_a$, preferably of 1500 to 10 000 D$_a$, an acid number of 10 to 80, preferably of 15 to 40, and an OH number of 15 to 165 mg KOH/g, preferably of 30 to 125 mg KOH/g.

The polyurethane resins of the invention can be used both in the form of aqueous dispersions and in the form of water-dilutable organic solutions. In the latter case, the solids content of the water-dilutable polyurethanes is 50% to 90%, preferably 70% to 90% and more preferably 75% to 90% by weight. The remainder to 100% by weight consists of organic solvents of the aforementioned kind and also of the auxiliaries and additives that, where appropriate, are typical of coating materials.

The present invention accordingly provides organic solutions comprising the water-dilutable, hydroxy-functional polyurethanes of the invention, having a water-dilutable polyurethane solids content of 50% to 90% by weight, with the remainder to 100% by weight consisting of organic solvents and also of the auxiliaries and additives that, where appropriate, are typical of coating materials.

Where the polyurethane resins of the invention are desired in the form of aqueous dispersions, they can easily be converted—following at least partial neutralization of the carboxylic acid groups with the abovementioned neutralizing agent—into stable, aqueous dispersions, by addition of water or by introduction into water. The aqueous dispersions have a solids of 35% to 70%, preferably of 40% to 65%, more preferably of 50 to 60% by weight.

The present invention likewise provides dispersions comprising the water-dilutable, hydroxy-functional polyurethanes of the invention, having a water-dilutable polyurethane solids content of 35% to 70% by weight, the remainder to 100% by weight consisting of water, organic solvents where appropriate, and also, where appropriate, auxiliaries and additives typical of coating materials.

The water-dilutable polyurethanes of the invention can be processed to aqueous coating compositions. Consequently, aqueous coating compositions comprising the polyurethane resins of the invention and also at least one crosslinker, preferably a polyisocyanate crosslinker, more preferably a polyisocyanate crosslinker having free isocyanate groups, are likewise provided by the present invention.

Examples of suitable crosslinkers are polyisocyanate crosslinkers, amide and amine-formaldehyde resins, phenolic resins, aldehydic and ketonic resins, such as phenol-formaldehyde resins, resoles, furan resins, urea resins, carbamidic ester resins, triazine resins, melamine resins, benzoguanamine resins, cyanamide resins or aniline resins.

Preferred crosslinkers used are polyisocyanates having free and/or blocked isocyanate groups. Preference is given to those crosslinker resins with non-blocked isocyanate groups, based for example on isophorone diisocyanate, hexamethylene diisocyanate or bis(4-isocyanatocyclohexane)methane or mixtures thereof, and also crosslinker resins of the abovementioned polyisocyanates that have been modified with uretdione, isocyanurate, urethane, allophanate, biuret, carbodiimide, iminooxadiazinedione and/or oxadiazinetrione structures.

Particularly preferred is the use of low-viscosity polyisocyanates of the aforementioned kind, where appropriate with hydrophilic modification. Hydrophilization of the polyisocyanates is possible, for example, by reaction with substoichiometric amounts of monohydric, hydrophilic polyether alcohols. The preparation of hydrophilized polyisocyanates of this kind is described for example in EP-A 0 540 985 (p. 3, l. 55 to p. 4, l. 5). Also highly suitable are the polyisocyanates containing allophanate groups that are described in EP-A 959 087 (p. 3, ll. 39 to 51), which are prepared by reacting low-monomer-content polyisocyanates with polyethylene oxide polyether alcohols under allophanati-zation conditions. Also suitable are the water-dispersible polyisocyanate mixtures based on triisocyanatononane that are described in DE-A 100 078 21 (p. 2, l. 66 to p. 3, l. 5), and also polyisocyanates hydrophilized with ionic groups (sulfonate groups, phosphonate groups), as disclosed for example in DE-A 100 24 624 (p. 3, ll. 13 to 33).

These polyisocyanates have in general a viscosity at 23° C. of 200 to 15 000 mPas, preferably 500 to 7500 mPas. If necessary, the polyisocyanates can be employed in a blend with small amounts of inert solvents, in order to lower the viscosity to a figure within the stated range. Triisocyanatononane as well can be used alone or in mixtures as a crosslinker component.

The aqueous coating compositions obtained in this way, comprising the polyurethanes of the invention, are suitable for all fields of use where aqueous paint and coating systems with exacting requirements concerning the surface quality and resistance of the films are used, examples being the coating of the surfaces of mineral construction materials, the varnishing and sealing of wood and wood-based materials, the coating of metallic surfaces (metal coating), the coating and painting of asphaltic or bituminous coverings, the painting and sealing of various plastics surfaces (plastics coating), and also high-gloss varnishes. In particular, however, they are suitable for producing soft feel effect coating materials which ensure high solvent resistance and, in particular, high resistance to sun lotion (in the suntan lotion test). Coating compositions of this kind are used preferably in plastics coating or wood coating, with curing taking place typically at temperatures between room temperature and 130° C.

The aqueous coating compositions comprising the water-dilutable polyurethanes of the invention are employed typically in one-coat finishes or in the clear coat or top coat (topmost coat) of multi-coat constructions.

The coating can be produced by the various spraying methods, such as compressed-air spraying, airless spraying or electrostatic spraying methods, for example, using one-component or, where appropriate, two-component spraying units. However, the paints and coating compositions comprising the binder dispersions of the invention can also be applied by other methods, such as by brushing, rolling or knife coating, for example.

EXAMPLES

Unless indicated otherwise, all percentages are by weight.

Viscosity measurements were carried out using a Paar-Physica MRC 51 cone-plate viscosimeter (Anton Paar, Stuttgart, Germany) in accordance with DIN 53019 at a shear rate of 40 $s^{-1}$.

The average particle size was determined by means of laser correlation spectroscopy (Zetasizer® 1000, Malvern Instruments, Herrenberg, Germany).

Hydroxyl number (OH—N): unit mg KOH/g; determination method in accordance with DIN 53240.

Acid number (A-N): unit mg KOH/g; determination method in accordance with DIN ISO 3682.

Raw Materials:

Acematt® OK 412: matting agent (Degussa, Frankfurt)
Aquacer® 535: wax emulsion (Byk Chemie, Wesel)
Bayblend® T65: amorphous, thermoplastic polymer blend based on polycarbonate (PC) and acrylonitrile-butadiene-styrene (ABS) (Bayer MaterialScience, Leverkusen)
Bayferrox® 318 M: pigment (Lanxess AG, Leverkusen)
Bayhydrol® PR 650: 50% aqueous, aliphatic polyurethane resin dispersion (Bayer MaterialScience, Leverkusen)
Bayhydrol® PT 355: 55% aqueous, aliphatic, hydroxy-functional polyester-polyurethane dispersion, OH content 1.5% on solids (Bayer MaterialScience, Leverkusen)
Bayhydur® 3100: hydrophilically modified, aliphatic polyisocyanate (Bayer MaterialScience, Leverkusen)
Byk® 348: wetting agent (Byk Chemie, Wesel)
Desmophen® C1200: linear, aliphatic polycarbonate-polyester, OH—N=56 (Bayer MaterialScience, Leverkusen)
Desmorapid® SO: urethanization catalyst (Bayer MaterialScience, Leverkusen)
Entschäumer DNE: defoamer (K. Obermayer, Bad Berleburg)
PACM® 20: isomer mixture of bis(4-aminocyclohexyl)methane (Dupont, Bad Homburg)
Pergopak® M3: filler matting agent (Martinswerk, Bergheim)
Silitin® Z 86: filler (Hoffmann & Söhne, Neuburg)
Talc IT Extra: filler (Norwegian Talc, Frankfurt)
Tego® Wet KL 245: wetting agent (50% in water; Tego Chemie, Essen)

Example 1

Diol Containing Amide Groups

A 5 L reaction vessel with stirrer, heating jacket, thermometer, distillation column and nitrogen inlet was charged with 460 g of ε-caprolactone and this initial charge was heated to 140° C. under a nitrogen stream of 10-12 L/h. Then 420 g of PACM® 20 were added dropwise at a rate such that the temperature did not exceed 160° C. Stirring was continued at 140° C. for 4 hours. Cooling to room temperature gave the diamine diol as a clear, viscous resin.

Amide group content (based on CONH): 19.6% by weight

Example 2

Diol Containing Amide Groups

A 5 L reaction vessel with stirrer, heating jacket, thermometer, distillation column and nitrogen inlet was charged with 460 g of ε-caprolactone and this initial charge was heated to 140° C. under a nitrogen stream of 10-12 L/h. Then 340 g of 1-amino-3,3,5-trimethyl-5-aminomethylcyclohexane (isophoronediamine) were added dropwise at a rate such that the temperature did not exceed 160° C. Stirring was continued at 140° C. for 4 hours. Cooling to room temperature gave the diamine diol as a clear, viscous resin.

Amide group content (based on CONH): 21.5% by weight

Example 3

Polyester Diol Containing Amide Groups

A 5 L reaction vessel with stirrer, heating jacket, thermometer, distillation column and nitrogen inlet was charged with 970 g of ε-caprolactone and 893 g of PACM® 20 and this initial charge was melted at 120° C. under a stream of nitrogen of 10-12 L/h. Subsequently the stirrer was engaged and the temperature was raised to 140° C. over the course of 2 hours. The mixture was left with stirring at 140° C. for 6 hours. Then 252 g of phthalic anhydride, 994 g of adipic acid, 1034 g of hexane-1,6-diol and 133 g of neopentyl glycol were added and the reaction mixture was heated to 220° C. over the course of 8 hours. It was held at 220° C. until the acid number (A-N) had dropped below 3. This gave a highly viscous, clear polyester resin having an A-N of 2.7 and an OH—N of 176.

Amide group content (based on CONH): 9.1% by weight

Example 4

Polyester Diol Containing Amide Groups

A 5 L reaction vessel with stirrer, heating jacket, thermometer, distillation column and nitrogen inlet was charged with 1797 g of ε-caprolactone and 1656 g of PACM® 20 and this initial charge was melted at 120° C. under a stream of nitrogen of 10-12 L/h. Subsequently the stirrer was engaged and the temperature was raised to 140° C. over the course of 2 hours. The mixture was left with stirring at 140° C. for 6 hours. Then 156 g of phthalic anhydride, 614 g of adipic acid, 366 g of hexane-1,6-diol and 82 g of neopentyl glycol were added and the reaction mixture was heated to 220° C. over the course of 8 hours. It was held at 220° C. until the acid number (A-N) had dropped below 3. This gave a highly viscous, clear polyester resin having an A-N of 2.5 and an OH—N of 165.

Amide group content (based on CONH): 15.0% by weight

Example 5

Inventive Polyurethane

A 5 l reaction vessel with cooling, heating and stirring apparatus was charged under a nitrogen atmosphere with 570 g of Desmophen® C1200, 585 g of amido-functional polyester from Example 3, 60 g of dimethylolpropionic acid and 45 g of trimethylolpropane and this initial charge was heated to 130° C. and homogenized for 30 minutes. It was then cooled to 80° C. and 1.1 g of Desmorapid® SO and 240 g of hexamethylene diisocyanate were added with vigorous stirring. Utilizing the exothermic heat of the reaction, the mixture increased in temperature to 140° C. It was maintained at this temperature until isocyanate groups were no longer detectable.

The resulting polyurethane was subsequently cooled down to 90°-100° C., 19 g of dimethylethanolamine were added and dispersion was carried out with 1230 g of water at room temperature. The resulting dispersion had a solids content of 55% by weight and, based on resin solids, an OH—N of 53 and an A-N of 18.1.

Amide group content (based on CONH): 3.5% by weight

Example 6

Inventive Polyurethane

A 5 l reaction vessel with cooling, heating and stirring apparatus was charged under a nitrogen atmosphere with 1084 g of amido-functional polyester from Example 3, 60 g of dimethylolpropionic acid and 45 g of trimethylolpropane and this initial charge was heated to 130° C. and homogenized for 30 minutes. It was then cooled to 80° C. and 1.1 g of Desmorapid® SO and 310 g of hexamethylene diisocyanate were added with vigorous stirring. Utilizing the exothermic heat of the reaction, the mixture increased in temperature to 140° C. It was maintained at this temperature until isocyanate groups were no longer detectable. The resulting polyurethane was subsequently cooled to 90°-100° C., 19 g of dimethylethanolamine were added and dispersion was carried out with 1045 g of water at room temperature. The resulting dispersion had a solids content of 59% by weight and, based on resin solids, an OH—N of 50 and an A-N of 18.8.

Amide group content (based on CONH): 6.8% by weight

Example 7

Inventive Polyurethane

A 5 l reaction vessel with cooling, heating and stirring apparatus was charged under a nitrogen atmosphere with 570 g of Desmophen® C1200, 585 g of amido-functional polyester from Example 4, 60 g of dimethylolpropionic acid and 45 g of trimethylolpropane and this initial charge was heated to 130° C. and homogenized for 30 minutes. It was then cooled to 80° C. and 1.1 g of Desmorapid® SO and 240 g of hexamethylene diisocyanate were added with vigorous stirring. Utilizing the exothermic heat of the reaction, the mixture increased in temperature to 140° C. It was maintained at this temperature until isocyanate groups were no longer detectable.

The resulting polyurethane was subsequently cooled to 90°-100° C., 19 g of dimethylethanolamine were added and dispersion was carried out with 1160 g of water at room temperature. The resulting dispersion had a solids content of 55% by weight and, based on resin solids, an OH—N of 46 and an A-N of 18.1.

Amide group content (based on CONH): 5.9% by weight

Example 8

Inventive Polyurethane

A 5 l reaction vessel with cooling, heating and stirring apparatus was charged under a nitrogen atmosphere with 570 g of Desmophen® C1200, 585 g of amido-functional diol from Example 1, 60 g of dimethylolpropionic acid and 45 g of trimethylolpropane and this initial charge was heated to 130° C. and homogenized for 30 minutes. It was then cooled to 80°

C. and 1.1 g of Desmorapid® SO and 240 g of hexamethylene diisocyanate were added with vigorous stirring. Utilizing the exothermic heat of the reaction, the mixture increased in temperature to 140° C.

It was maintained at this temperature until isocyanate groups were no longer detectable. The resulting polyurethane was subsequently cooled to 90°-100° C., 19 g of dimethylethanolamine were added and dispersion was carried out with 1160 g of water at room temperature. The resulting dispersion had a solids content of 54% by weight and, based on resin solids, an OH—N of 72.5 and an A-N of 18.1.

Amide group content (based on CONH): 7.6% by weight

Application Example

Formula Composition of 2-Component Soft Feel Coating Materials

|  |  | Example |  |  |  |
|---|---|---|---|---|---|
|  |  | 9 | 10 | 11 | 12 |
| Example 5 | Component 1 | 62.3 | — | — | — |
| Example 6 |  | — | 68.1 | — | — |
| Example 7 |  | — | — | 65.8 | — |
| Bayhydrol ® PT 355 |  | — | — | — | 72.7 |
| Bayhydrol ® PR 650 | Component 2 | 80.0 | 80.0 | 80.0 | 80.0 |
| Entschäumer DNE 01 | Additives | 0.6 | 0.6 | 0.6 | 0.5 |
| Tego ® Wet KL 245, 50% in water |  | 0.9 | 0.9 | 0.9 | 0.9 |
| Byk ® 348 |  | 1.4 | 1.4 | 1.4 | 1.4 |
| Aquacer ® 535 |  | 4.0 | 4.0 | 4.0 | 4.0 |
| Sillitin ® Z 86 |  | 14.0 | 13.9 | 13.9 | 13.9 |
| Talc IT extra |  | 11.2 | 11.1 | 11.1 | 11.1 |
| Bayferrox ® 318 |  | 37.3 | 37.1 | 37.1 | 36.9 |
| Acematt ® OK 412 |  | 7.5 | 7.4 | 7.4 | 7.4 |
| Water, demineralized |  | 40.0 | 57.1 | 49.3 | 40.0 |
| Bayhydur ® 3100, 75% in MPA | Component 3 | 17.7 | 17.0 | 17.0 | 16.5 |

Dispersion of Soft Feel Coating Materials:

To produce the coating material the binders as per Table 1 (components 1 and 2) are dispersed with the additives as per Table 1 and demineralized water in accordance with the quantity figures of Table 1, in a bead mill, to give an aqueous millbase. After a standing time at room temperature of 16 hours, a 75% strength solution of the polyisocyanate crosslinker Bayhydur® 3100 in methoxypropyl acetate (component 3, amounts as per Table 1) is incorporated into this millbase using a dissolver.

The coating material thus obtained is applied by spraying to a planar surface (dry film thickness 40 μm-50 μm) and, after a 10-minute flash-off time at 55% relative atmospheric humidity, is then dried at 80° C. for 30 minutes and subsequently at 60° C. for 16 hours.

This gives a uniform, matt coating film with a pronounced soft feel effect, which can be described as velvety-smooth.

Determination of Solvent Resistance

In order to determine the solvent resistances the soft feel coating materials of Table 1 above were applied to glass and dried as described. For the purpose of testing, a cotton pad soaked with solvent is placed on the coating. In the case of low-boiling solvents, the cotton pad is additionally covered with a watch glass. Evaluation takes place after a 1-minute exposure time. The cotton pad is then removed and residual solvent is wiped off using a cellulose cloth. The test area is then rated immediately by inspection and by scratching with the finger nail (for assessments see below)

| Example |  | EtAc | MPA | Xylene | EtOH | SB | $H_2O$ |
|---|---|---|---|---|---|---|---|
| 9 | Example 5 | 2 | 0 | 0 | 1 | 1 | 0 |
| 10 | Example 6 | 3 | 1 | 1 | 1 | 1 | 0 |
| 11 | Example 7 | 3 | 1 | 1 | 0 | 1 | 0 |
| 12 | Bayhydrol ® PT 355 | 4 | 3 | 3 | 2 | 2 | 2 |

EtAc = ethyl acetate,
MPA = methoxypropyl acetate,
EtOH = ethanol,
SB = premium-grade petrol Assessment 0 no alteration, no damage
1 trace alteration (swelling ring is very weak, visible only by reflection under light, no softening ascertainable with the finger nail)
2 slight alteration (swelling ring is visible in the light, finger nail scratch tracks visible)
3 marked alteration (complete swelling ring is clearly visible, scratch tracks visible, with the finger nail, softening ascertainable)
4 severe alteration (complete swelling ring is extremely pronounced, scratching with the finger nail is possible down to the substrate, tacky)
5 destroyed (coating material surface detached/destroyed).

The coating materials of Examples 9 to 11, containing the amido-functional polyurethane resins, are distinguished by substantially better solvent resistance than the standard (Example 12).

Determination of Cream Resistance

For the determination of the solvent resistances the soft feel coating materials as per Table 1 were applied to Bayblendg T65 test sheets and dried as described.

Approximately 1 ml of each of the test media (Coppertone Waterbabies SPF30 water-resistant, manufacturer: Schering-Plough HealthCare Products Inc.; Delial Plus Vitamin SF30 water-resistant, manufacturer: L'Oréal Deutschland GmbH, 40474 Düsseldorf; Kamill Classic Hand & Nail Cream, manufacturer: Burnus GmbH, 40474 Düsseldorf) were applied to the soft feel coating material within a metal ring with a diameter of 2 cm. After an exposure time at 80° C. of 1 hour, the creams were wiped off with a cotton cloth and the damage was assessed visually in accordance with the scale given below.

Evaluation

| Example |  | Coppertone Waterbabies SPF30 water-resistant | Delial Plus Vitamin SF30 water-resistant | Kamill Classic Hand & Nail Cream |
|---|---|---|---|---|
| 9 | Example 5 | 3 | 3 | 3 |
| 10 | Example 6 | 3 | 3 | 3 |
| 11 | Example 7 | 3 | 3 | 3 |
| 12 | Bayhydrol ® PT 355 | 4 | 4 | 4 |

Assessment:

1—no change

2—temporary damage

3—marking/loss of gloss/colour change

4—softening

5—blister/detachment from substrate

6—broken up

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water-dilutable, hydroxy-functional polyurethane comprising at least one structural unit of the formula (I)

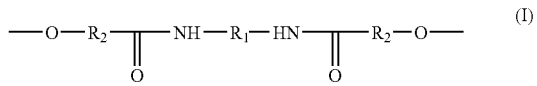

in which

R1 is an aliphatic or cycloaliphatic radical having 2 to 18 carbon atoms and

R2 is an aliphatic radical having 3 to 5 carbon atoms.

2. A water-dilutable, hydroxy-functional polyurethane according to claim 1, wherein the polyurethane has an amide group content, calculated as (CO)NH, of 2,0% to 20% by weight.

3. A water-dilutable, hydroxy-functional polyurethane according to claim 1, wherein the polyurethane is the reaction product of:
   A1) 25%-80% by weight of at least one polyol containing amide groups, with a number-average molecular weight Mn of 314 to 5000 Da,
   A2) 0%-60% by weight of at least one polyol selected from the group of polyesters, polycarbonates or polyethers, with a number-average molecular weight Mn of 400 to 6000 Da,
   A3) 0%-20% by weight of at least one low molecular weight polyol having at least two hydroxyl groups, with a number-average molecular weight of 62 to 400 Da,
   A4) 2%-10% by weight of at least one compound which has at least two groups that are reactive towards isocyanate groups, and at least one group that is capable of forming anions, and
   A5) 5%-50% by weight of polyisocyanates,
   the sum of components A1) to A5) totaling 100%.

4. A water-dilutable, hydroxy-functional polyurethane according to claim 3, wherein component A1) comprises the reaction products of a) one or more compounds selected from the group consisting of 1,6-hexamethylene-diamine, 2-methyl-1,5-diaminopentane, 1-amino-3,3,5-trimethyl-5-aminomethylcyclohexane (isophoronediamine), the isomers of bis(4-aminocyclohexyl)methane, and mixtures thereof, with b) ε-caprolactone.

5. A water-dilutable, hydroxy-functional polyurethane according to claim 3, wherein component A1) is a polyester polyol containing amide groups.

6. A water-dilutable, hydroxy-functional polyurethane according to claim 3, wherein component A1) comprises structural units of formula (I), and has an amide group content, calculated as (CO)NH, of at least 7.5% by weight.

7. An organic solution comprising a water-dilutable, hydroxy-functional polyurethane according to claim 1, wherein the water-dilutable polyurethane solids content is from 50% to 90% by weight and the remainder to 100% by weight comprises organic solvents and optionally auxiliaries and additives.

8. A dispersion comprising a water-dilutable, hydroxy-functional polyurethane according to claim 1, wherein the water-dilutable polyurethane solids content is from 35% to 70% by weight and the remainder to 100% by weight comprises water, organic solvents and optionally auxiliaries and additives.

9. An aqueous coating composition comprising a dispersion according to claim 8 and at least one crosslinker.

10. An aqueous coating composition according to claim 9, wherein the crosslinker is a polyisocyanate.

11. An aqueous coating composition according to claim 10, wherein the polyisocyanate is in non-blocked form.

12. A multi-layer coating composition with a clearcoat or topcoat material, comprising water-dilutable, hydroxy-functional polyurethanes according to claim 1, as topmost top layer.

* * * * *